United States Patent
Zhang et al.

(10) Patent No.: US 10,933,987 B2
(45) Date of Patent: Mar. 2, 2021

(54) MULTIROTOR AIRCRAFT WITH AN AIRFRAME AND A THRUST PRODUCING UNITS ARRANGEMENT

(71) Applicant: AIRBUS HELICOPTERS DEUTSCHLAND GMBH, Donauworth (DE)

(72) Inventors: Qinyin Zhang, Augsburg (DE); Uwe Kiesewetter, Rain am Lech (DE); Sebastian Mores, Munich (DE); Marco Schneeberger, Rosenheim (DE); Marius Bebesel, Augsburg (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 372 days.

(21) Appl. No.: 15/906,227

(22) Filed: Feb. 27, 2018

(65) Prior Publication Data

US 2018/0265189 A1    Sep. 20, 2018

(30) Foreign Application Priority Data

Feb. 28, 2017   (EP) .................................... 17400009

(51) Int. Cl.
*B64C 27/52*    (2006.01)
*B64C 27/08*    (2006.01)
(Continued)

(52) U.S. Cl.
CPC .............. *B64C 27/52* (2013.01); *B64C 27/00* (2013.01); *B64C 27/08* (2013.01); *B64C 27/20* (2013.01);
(Continued)

(58) Field of Classification Search
CPC ......... B64C 27/28; B64C 29/00; B64C 27/00; B64C 27/52; B64C 27/08; B64C 27/20; B64C 29/0033
See application file for complete search history.

(56) References Cited

U.S. PATENT DOCUMENTS 4,212,588 A * 7/1980 Fradenburgh ............. B64C 7/00
                                                          244/17.27
4,771,967 A    9/1988 Geldbaugh
(Continued)

FOREIGN PATENT DOCUMENTS

CN    201306711 Y    9/2009
CN    105539829 A *  5/2016
(Continued)

OTHER PUBLICATIONS

Translation of CN-105539829-A (Year: 2016).*
(Continued)

*Primary Examiner* — Richard R. Green
*Assistant Examiner* — Steven J Shur
(74) *Attorney, Agent, or Firm* — Brooks Kushman P.C.

(57) ABSTRACT

A multirotor aircraft with an airframe and a thrust producing units arrangement, wherein the thrust producing units arrangement comprises a predetermined number of thrust producing units for producing thrust in a predetermined direction, and wherein a flexible suspension unit is rigidly mounted to the airframe, wherein the flexible suspension unit comprises at least one bearing that mechanically couples the thrust producing units arrangement to the airframe such that the thrust producing units of the predetermined number of thrust producing units are inclinable in relation to the airframe.

18 Claims, 7 Drawing Sheets

(51) Int. Cl.
  *B64C 27/20* (2006.01)
  *B64C 27/00* (2006.01)
  *B64C 27/28* (2006.01)
  *B64C 29/00* (2006.01)

(52) U.S. Cl.
  CPC .............. *B64C 27/28* (2013.01); *B64C 29/00* (2013.01); *B64C 29/0033* (2013.01); *B64C 2201/024* (2013.01); *B64C 2201/108* (2013.01); *B64C 2201/162* (2013.01)

(56) References Cited

U.S. PATENT DOCUMENTS

| | | | |
|---|---|---|---|
| 6,568,630 B2 | 5/2003 | Yoeli | |
| 7,857,253 B2 | 12/2010 | Yoeli | |
| 7,946,528 B2 | 5/2011 | Yoeli | |
| D678,169 S | 3/2013 | Kennelly et al. | |
| 8,393,564 B2 | 3/2013 | Kroo | |
| 8,733,690 B2 | 5/2014 | Bevirt et al. | |
| 9,187,174 B2 * | 11/2015 | Shaw | B64C 27/28 |
| 2007/0034738 A1 | 2/2007 | Sanders, Jr. et al. | |
| 2013/0118856 A1 | 5/2013 | Long | |
| 2015/0127209 A1 | 5/2015 | Al-Gami et al. | |
| 2015/0239555 A1 * | 8/2015 | Foskey | B64C 11/04 |
| | | | 416/134 A |
| 2016/0207625 A1 | 7/2016 | Judas et al. | |
| 2016/0291598 A1 * | 10/2016 | Youmans | B64C 39/024 |
| 2016/0347443 A1 | 12/2016 | Lee | |

FOREIGN PATENT DOCUMENTS

| | | |
|---|---|---|
| CN | 105539829 A | 5/2016 |
| DE | 102005022706 A1 | 11/2006 |
| DE | 102013108207 A1 | 2/2015 |
| EP | 2234883 B1 | 10/2010 |
| EP | 2551190 A1 | 1/2013 |
| EP | 2551193 A1 | 1/2013 |
| EP | 2551198 A1 | 1/2013 |
| GB | 905911 | 11/1962 |
| KR | 101451646 B1 | 10/2014 |
| WO | 2012141736 A1 | 10/2012 |
| WO | 2015028627 A1 | 3/2015 |
| WO | 2016035068 A2 | 3/2016 |
| WO | 2016035068 A3 | 3/2016 |

OTHER PUBLICATIONS

European Search Report for European Application No. EP17400009, Completed by the European Patent Office, dated May 8, 2017, 8 pages.

* cited by examiner

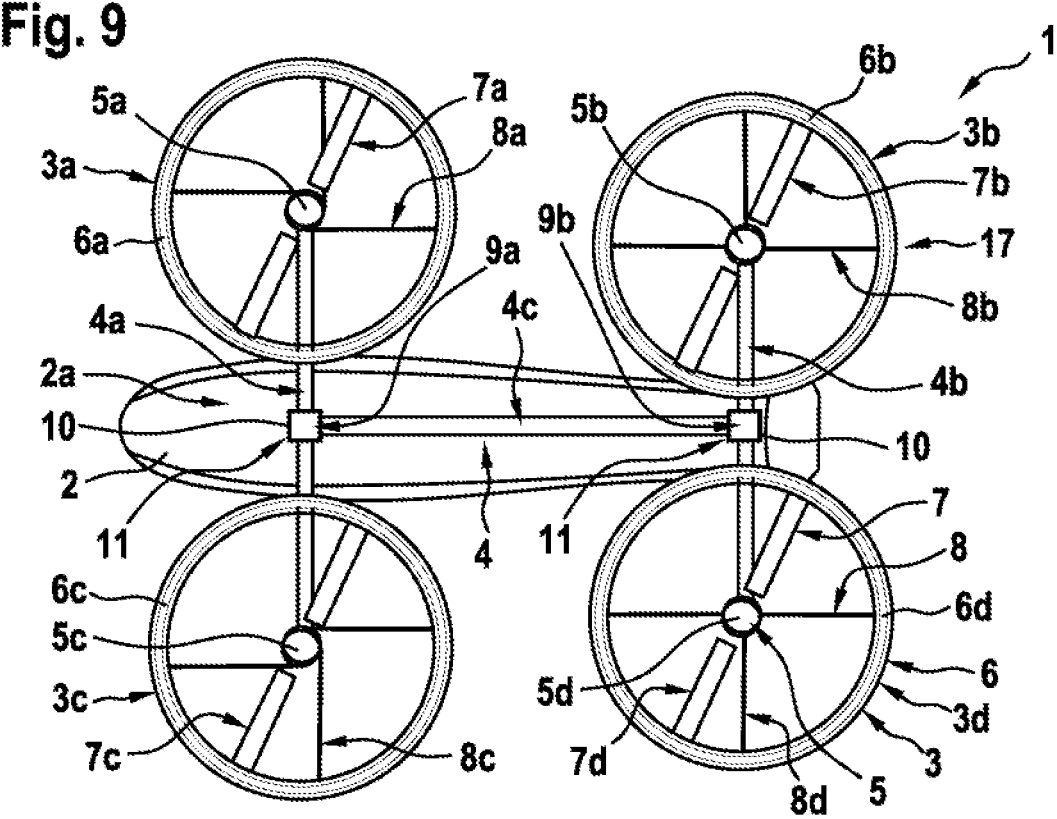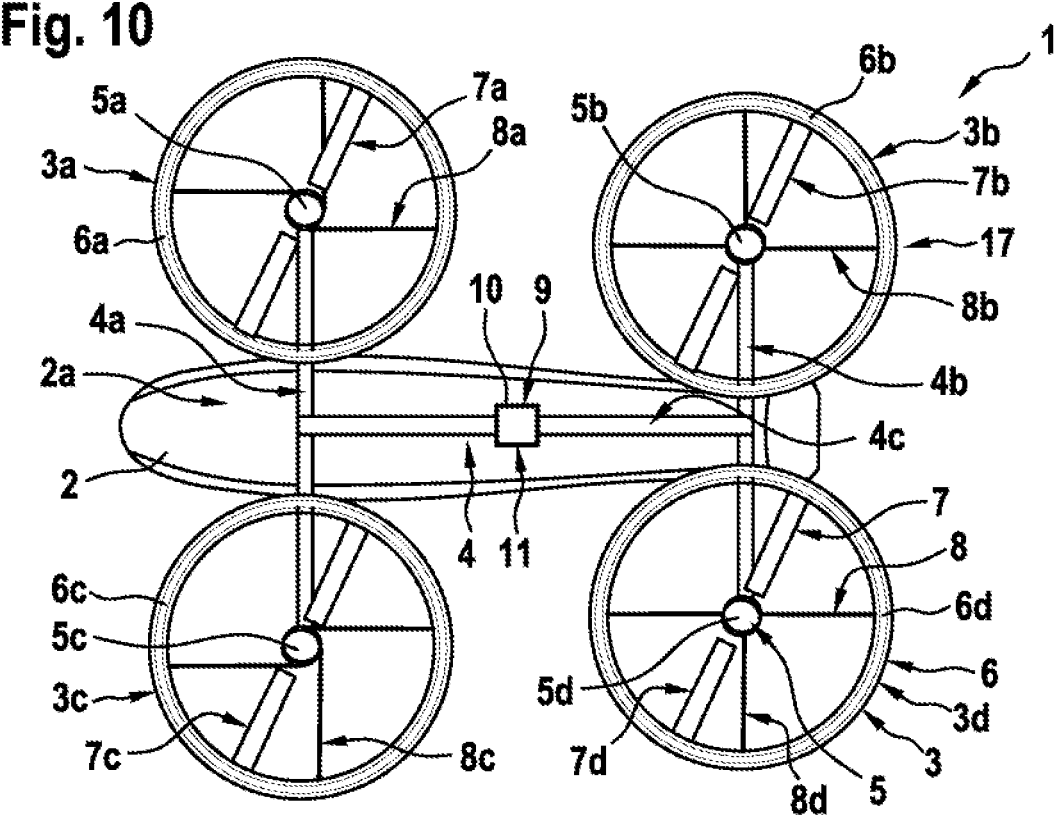

MULTIROTOR AIRCRAFT WITH AN AIRFRAME AND A THRUST PRODUCING UNITS ARRANGEMENT

CROSS-REFERENCE TO RELATED APPLICATIONS

This application claims priority to European patent application No. EP 17400009.1 filed on Feb. 28, 2017, the disclosure of which is incorporated in its entirety by reference herein.

BACKGROUND OF THE INVENTION (1) Field of the Invention

The invention is related to a multirotor aircraft with an airframe and a thrust producing units arrangement that comprises a predetermined number of thrust producing units for producing thrust in a predetermined direction.

2) Description of Related Art

Various conventional multirotor aircrafts are known, e. g. from the documents EP 2 551 190 A1, EP 2 551 193 A1, EP 2 551 198 A1, EP 2 234 883 A1, WO 2015/028627 A1, U.S. Pat. No. D678 169 S, U.S. Pat. No. 6,568,630 B2, U.S. Pat. No. 8,393,564 B2, U.S. Pat. No. 7,857,253 B2, U.S. Pat. No. 7,946,528 B2, U.S. Pat. No. 8,733,690 B2, US 2007/0034738 A1, US 2013/0118856 A1, DE 10 2013 108 207 A1, GB 905 911 and CN 2013 06711 U. Other multirotor aircrafts are also known from the state of the art, such as e. g. the Boeing CH-47 tandem rotor helicopter, the Bell XV-3 tilt rotor aircraft, the Bell XV-22 quad tilt with ducted rotors, as well as so-called drones and, more particularly, so-called quad drones, such as e. g. described in the documents US 2015/0127209 A1, DE 10 2005 022 706 A1 and KR 101 451 646 B1. Furthermore, multirotor aircraft studies and fictions also exist, such as e. g. the skyflyer SF MK II from Skyflyer Technology GmbH and the multicopter shown in the Avatar movie.

Each one of these conventional multirotor aircrafts is equipped with two or more thrust producing units that are provided for producing thrust in a predetermined direction during operation of the multirotor aircraft. In general, each thrust producing unit includes one or more rotors or propellers and is, usually, designed for specific flight conditions. By way of example, a thrust producing unit that is designed as an airplane propeller operates at its optimum in cruise conditions, whereas a thrust producing unit that is designed as propeller of a compound helicopter is rather optimized for hover or forward flight conditions, while a thrust producing unit that implements e. g. a so-called Fenestron® tail rotor is particularly designed for hover conditions.

In all of these examples, the respective thrust producing unit is optimized for operation in axial air flow conditions, i. e. in an air flow direction that is oriented at least approximately along a rotor axis resp. rotation axis of the given one or more rotors or propellers and, therefore, referred to as an axial air flow direction. If, however, the respective thrust producing unit is operated in transversal air flow conditions, i. e. in an air flow direction that is oriented transverse to the rotor axis of the given one or more rotors or propellers and, therefore, referred to as a non-axial air flow direction, a respective efficiency of the thrust producing unit usually decreases considerably.

By way of example, the usual flight path of a multirotor aircraft with two or more thrust producing units consists in taking off vertically, performing forward flight to a given destination, and then landing vertically. The vertical take-off and landing phases may e. g. be combined with respective hovering phases.

During the vertical take-off phase, for instance, the thrust producing units of the multirotor aircraft will be subjected to axial air flow conditions. Then, after the vertical take-off and/or a respective hovering phase, the multirotor aircraft needs to be accelerated in a predetermined forward flight direction to perform forward flight to the given destination. Required propulsion forces for the acceleration and for the compensation of occurring drag forces during the forward flight are usually generated by tilting resp. inclining the thrust producing units from a vertical take-off position into a forward flight position. In other words, respective thrust vectors generated by the thrust producing units are inclined in a predetermined direction by rotating the thrust producing units accordingly, so that the multirotor aircraft gains velocity and leaves a previous vertical take-off or hovering phase such that is converts to forward flight, wherein the thrust producing units are subjected to transversal air flow conditions.

Upon arrival at the given destination, the thrust producing units are usually tilted back from the forward flight position into the vertical take-off position. Thus, landing at the given destination can be performed.

However, the provision of tiltable thrust producing units results in high system complexity and system weight due to a need of controlling and surveillance of required active actuation means. In particular, already the provision of such required active actuation means usually significantly increases an underlying system complexity and weight, so that respective maintenance costs of such multirotor aircrafts are generally very high, thus, limiting usage of such multirotor aircrafts at least mainly to military or governmental applications. Therefore, current multirotor aircrafts are predominantly provided with fixed attachment units for rigidly attaching respective thrust producing units to corresponding multirotor aircraft airframes.

In case of such a fixed attachment unit that rigidly attaches a respective thrust producing unit to an airframe of a given multirotor aircraft, tilting of one or more of the thrust producing units corresponds to inclining the complete airframe, i. e. of the entire multirotor aircraft. However, in particular for recently appearing multirotor aircraft concepts related to fast flying and/or passenger carrying multirotor aircrafts, such an inclining of the entire multirotor aircraft implies multiple technical problems and disadvantages, as described hereinafter.

More specifically, when using such a fixed attachment unit with a given multirotor aircraft, the entire multirotor aircraft must be inclined during forward flight so that a respectively required propulsive force can be generated. However, the faster the given multirotor aircraft is intended to fly, the higher an underlying degree of inclination must be chosen, in particular for fast forward flight. Unfortunately, a higher degree of inclination automatically leads to higher drag which, in turn, limits an obtainable performance of the given multirotor aircraft.

Furthermore, with respect to passenger comfort, a typical maximum inclination angle for cabin inclination with respect to the passenger's acceptance and comfort ranges between +/−5°. However, when using a fixed attachment unit with a given multirotor aircraft, this typical maximum inclination angle would limit an achievable magnitude of a maximum achievable propulsive force, which is the horizontal component of a respectively generated thrust vector at a given inclination angle, thus, significantly limiting an overall achievable performance of the given multirotor aircraft. Furthermore, the fixed attachment unit will directly propagate vibration of the thrust producing units into a respective passenger cabin of the given multirotor aircraft, which will further degrade the passenger comfort.

Moreover, when using a fixed attachment unit with a given multirotor aircraft, the latter requires additional manoeuvring engine overpower for enabling manoeuvring flight. This overpower must be defined according to weight and inertia of the entire multirotor aircraft. In other words, comparatively high manoeuvring overpowers must be designed according to a respective total mass of the given multirotor aircraft.

Finally, when using a fixed attachment unit with a given multirotor aircraft, the entire multirotor aircraft must be moved or rotated to compensate any influence of gust during operation. However, this will lead to a comparatively high power consumption.

The document CN 105 539 829 A describes a multirotor aircraft with four thrust producing units for producing thrust in a predetermined direction. The four thrust producing units are divided into two pairs of thrust producing units, each pair including two thrust producing units that are connected to each other by means of a cuboid-shaped carrier beam. Each cuboid-shaped carrier beam is rotatably supported by means of a bracket at a support unit that is rigidly mounted to the multirotor aircraft. The bracket and the support unit define a gimbal joint. Similarly, each thrust producing unit is rotatably supported by means of a bracket at a fork-shaped axial end of the cuboid-shaped carrier beam, wherein the bracket and the fork-shaped end define a gimbal joint.

However, this multirotor aircraft is comparatively instable during flight, in particular in difficult flight conditions, e. g. upon occurrence of wind turbulences and/or gust, as each pair of thrust producing units can easily be rotated in such difficult flight conditions around its associated bracket at the support unit, which defines a gimbal joint of easy motion. In other words, this multirotor aircraft is particularly difficult to control, as even minor condition changes may lead to rotation of each pair of thrust producing units around its associated bracket at the support unit. Nevertheless, also under undisturbed flight conditions, each thrust producing unit must constantly be controlled to gain a stable flight attitude.

The document US 2016/0347443 A1 describes a similar multirotor aircraft. However, in contrast to the above described multirotor aircraft, each pair of thrust producing units now includes two thrust producing units that are connected to each other by means of a cylindrical carrier beam that is rotatably accommodated in ring-shaped brackets.

Nevertheless, rotation of the thrust producing units around a corresponding rotation axis that is defined by the cylindrical carrier beam requires complex mechanical control linkages and electronic control components. Furthermore, provision of respective gimbal joints for rotatably supporting the thrust producing units as such results in that this multirotor aircraft is also comparatively instable during flight, in particular in difficult flight conditions, e. g. upon occurrence of wind turbulences and/or gust, as each single thrust producing unit can easily be rotated in such difficult flight conditions by means of its gimbal joint, which defines rotational support of easy motion.

The document U.S. Pat. No. 4,771,967 describes a multirotor aircraft with two thrust producing units which form a sheltered assembly that is articulately attached to an airframe of the multirotor aircraft. In particular, the sheltered assembly is seated on a vertical driveshaft by means of universal joints and gearing and bearing means, through which power is transmitted to the thrust producing units. The sheltered assembly is further connected to lateral pivot actuators that are required for tilting resp. inclining the sheltered assembly with respect to the airframe.

However, the construction of the sheltered assembly and the need for the universal joints as well as the gearing and bearing means that allow seating and articulately mounting the sheltered assembly on the airframe, resp. to the vertical drive shaft, is very complicated and implies a comparatively great number of constituent components. Furthermore, the lateral pivot actuators still increase the already great number of constituent components as well as the complexity of the construction. Moreover, power transmission through the universal joint leads to comparatively high demands concerning a respectively used material. Thus, maintenance as such is difficult and time-consuming and high maintenance costs arise.

BRIEF SUMMARY OF THE INVENTION

It is, therefore, an object of the present invention to provide a new multirotor aircraft with an airframe and a thrust producing units arrangement with a predetermined number of thrust producing units that are inclinable in relation to the airframe.

This object is solved by a multirotor aircraft with an airframe and a thrust producing units arrangement, the multirotor aircraft comprising the features of claim 1. More specifically, according to the present invention a multirotor aircraft comprises an airframe and a thrust producing units arrangement, wherein the thrust producing units arrangement comprises a predetermined number of thrust producing units for producing thrust in a predetermined direction. A flexible suspension unit is rigidly mounted to the airframe. The flexible suspension unit comprises at least one bearing that mechanically couples the thrust producing units arrangement to the airframe such that the thrust producing units of the predetermined number of thrust producing units are inclinable in relation to the airframe.

Advantageously, the thrust producing units of the predetermined number of thrust producing units are inclinable for forward flight in relation to the airframe and independently of the airframe to generate a required propulsion force. Thus, a respective overall inclination of the airframe as such can be kept small, therefore, decreasing drag of the airframe due to its ideal inclination angle. Beneficially, less drag leads to a reduction of required power.

Furthermore, in manoeuvring flight and upon occurrence of gust, advantageously only the thrust producing units need to be inclined or rotated, while the airframe possesses a natural pendulum stability below the flexible suspension unit. Since the inertia of an overall moving mass is reduced, still less power will be consumed and a smaller engine can be used.

In other words, by means of the above described measures, power consumption of the inventive multirotor aircraft can be reduced significantly. In addition, by reducing the power consumption, an increased endurance, increased power availability, and reduced acoustic emission of the inventive multirotor aircraft can be achieved.

According to one aspect, the predetermined number of thrust producing units of the thrust producing units arrangement includes at least two and, preferentially, three or more thrust producing units. These thrust producing units preferably deliver a lift force in hover as well as lift and propulsive forces in forward flight. The propulsive force is advantageously obtained by tilting resp. inclining the thrust producing units, i.e. a respectively generated thrust force, into forward flight direction.

Preferably, the predetermined number of thrust producing units of the thrust producing units arrangement is suspended above the airframe of the inventive multirotor aircraft by means of the inventive flexible suspension unit, which forms a robust and flexible suspension between the thrust producing units and the airframe. Thus, in operation of the inventive multirotor aircraft, the airframe is suspended below the predetermined number of thrust producing units of the thrust producing units arrangement by means of the flexible suspension unit. The suspension of the airframe below the predetermined number of thrust producing units of the thrust producing units arrangement is naturally stable due to pendulum stability.

Advantageously, the flexible suspension unit is adapted for introducing at least one additional degree of freedom (DoF) into the connection between the predetermined number of thrust producing units of the thrust producing units arrangement and the airframe. More specifically, the flexible suspension unit decouples the predetermined number of thrust producing units of the thrust producing units arrangement from the airframe, so that a respective pitch attitude of the airframe in forward flight can be reduced significantly.

In other words, in forward flight the thrust producing units can be tilted resp. inclined without increasing a respective inclination angle of the airframe, thus, increasing e.g. passenger comfort, if the inventive multirotor aircraft is used for passenger transport. Furthermore, decoupling of the thrust producing units from the airframe by means of the flexible suspension unit also reduces vibration, which could propagate from the thrust producing units into the airframe, i.e. a respective passenger cabin provided therein.

According to one aspect, the flexible suspension unit comprises at least one bearing with at least one DoF, preferably with two DoF and, preferentially, with three DoF. Such a provision of one to three DoF is advantageously realizable utilizing e.g. an elastomeric bearing or a rotational bearing. In any case, additional dampers or mechanical limiters can be applied to adjust or limit a respective rotational displacement of the airframe relative to the predetermined number of thrust producing units of the thrust producing units arrangement in operation of the inventive multirotor aircraft.

Advantageously, by using the flexible suspension unit with the at least one bearing, there is no need of additionally introducing an active tilting or inclining mechanism to the inventive multirotor aircraft. Thus, an underlying aircraft system can be strongly simplified and respective maintenance costs can be reduced significantly.

According to a preferred embodiment, the thrust producing units arrangement is suspended from the flexible suspension unit towards the airframe by means of the at least one bearing. Preferably, the at least one bearing is an elastomeric bearing, in particular a spherical elastomeric bearing or a cylindrical elastomeric bearing.

According to a further preferred embodiment, the predetermined number of thrust producing units comprises at least two mechanically coupled thrust producing units that are mechanically coupled to the airframe by means of the at least one bearing. Preferably, the at least one bearing is an elastomeric bearing, in particular a spherical elastomeric bearing or a cylindrical elastomeric bearing.

According to a further preferred embodiment, the predetermined number of thrust producing units comprises four thrust producing units that are mechanically coupled to each other in an H-shaped configuration. Respectively two thrust producing units are mechanically coupled to each other by means of an at least essentially straight structural support member. The H-shaped configuration is mechanically coupled to the airframe by means of the at least one bearing. Preferably, the at least one bearing is an elastomeric bearing, in particular a spherical elastomeric bearing or a cylindrical elastomeric bearing.

According to a further preferred embodiment, each at least essentially straight structural support member is mechanically coupled to the airframe by means of an associated bearing. Preferably, each associated bearing is an elastomeric bearing, in particular a spherical elastomeric bearing or a cylindrical elastomeric bearing.

According to a further preferred embodiment, the predetermined number of thrust producing units comprises four thrust producing units that are mechanically coupled to each other in an X-shaped configuration. The X-shaped configuration is mechanically coupled to the airframe by means of the at least one bearing. Preferably, the at least one bearing is an elastomeric bearing, in particular a spherical elastomeric bearing or a cylindrical elastomeric bearing.

According to a further preferred embodiment, the flexible suspension unit comprises at least one mechanical movement limiter for limiting inclination of the thrust producing units of the predetermined number of thrust producing units in relation to the airframe.

According to a further preferred embodiment, the flexible suspension unit comprises at least one dampening unit for dampening movement of the thrust producing units of the predetermined number of thrust producing units in relation to the airframe.

According to a further preferred embodiment, the flexible suspension unit comprises at least one actuating unit for controlling inclination of the thrust producing units of the predetermined number of thrust producing units in relation to the airframe.

According to a further preferred embodiment, the flexible suspension unit is detachably mounted to the airframe.

It should be noted that although the inventive multirotor aircraft is described hereinafter with reference to a multirotor structure with multiple rotor assemblies, it could likewise be implemented as a multipropeller structure with multiple propeller assemblies or as a multipropeller and -rotor structure. More specifically, while rotors are generally fully articulated, propellers are generally not articulated at all. However, both can be used for generating thrust and, thus, for implementing the thrust producing units according to the present invention. Consequently, any reference to rotors or rotor structures in the present description should likewise be understood as a reference to propellers and propeller structures, so that the inventive multirotor aircraft can likewise be implemented as a multipropeller and/or multipropeller and -rotor aircraft.

According to one aspect, the inventive multirotor aircraft comprises a multiple thrust configuration with one or more rotors/propellers that define one or more rotor/propeller planes, which can be selected to be positioned atop of each other individually, a shrouding for enclosing any rotating parts of at most one of the rotors/propellers, at least one electrical engine which drives each rotor/propeller, wherein each engine can be segregated in order to increase a provided safety level, and wherein a logic connection preferably exists between battery and electrical engines, the logic connection preferentially comprising a redundant design increasing the safety level in case of failure, and wherein preferably a battery redundancy layout with an appropriate safety level in case of failure is provided.

Preferably, the inventive multirotor aircraft is designed for transportation of passengers and is, in particular, suitable and adapted for being certificated for operation within urban areas. It is preferably easy to fly, has multiple redundancies, meets the safety demands of the authorities, is cost efficient in design and only creates comparatively low noise. Preferably, the inventive multirotor aircraft has a comparatively small rotor diameter with a light weight design and a fixed angle of incident, and is nevertheless adapted for fulfilment of an emergency landing, although these rotor characteristics lead to a comparatively low inertia and a non-adjustable torque in operation.

According to one aspect, the inventive multirotor aircraft is capable of hovering and comprises a distributed propulsion system. It is further preferably designed with autorotation capability, which is necessary amongst other requirements in order to meet authority regulations, such as e.g. FAR and EASA regulations, regarding safety failure modes that amount up to approximately $1*10^{-9}$ failures per flight hour for the entire multirotor aircraft. In the aeronautical sector, these safety levels are typically defined by the so-called Design Assurance Levels (DAL) A to D.

Preferably, the inventive multirotor aircraft fulfils the authorities' regulation safety level needed to transport passengers. This is preferably achieved by a combination and correlation of:
one or more individual rotor assemblies per thrust producing unit,
a redundant, segregated battery layout,
a redundant power supply and harness layout,
a physical separation and segregation of an underlying power management,
redundant, segregated electrical engines, and
pitch control and/or RPM control of the rotor assemblies.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 9 shows a top view of the multirotor aircraft of FIG. 1 with a predetermined number of exemplary thrust producing units in H-shaped configuration and two flexible suspension units according to one aspect, FIG. 10 shows a top view of the multirotor aircraft of FIG. 1 with a predetermined number of exemplary thrust producing units in H-shaped configuration and a single flexible suspension unit according to one aspect.

DETAILED DESCRIPTION OF THE INVENTION

Figure 1:
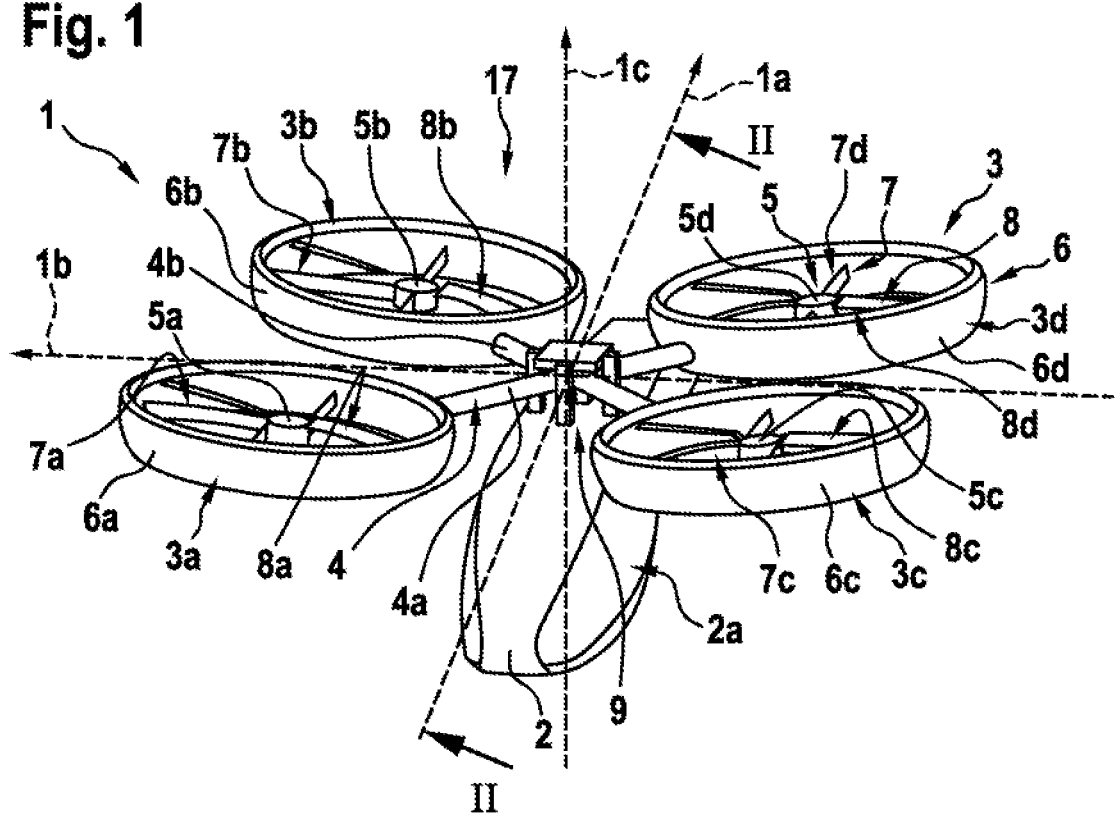
FIG. 1 shows a perspective view of a multirotor aircraft with a predetermined number of exemplary thrust producing units in X-shaped configuration and a single flexible suspension unit according to one aspect.

FIG. 1 shows a multirotor aircraft 1 with an aircraft airframe 2 according to the present invention. The airframe 2 defines a supporting structure of the multirotor aircraft 1.

The airframe 2 has an extension in longitudinal direction 1a, an extension in lateral direction 1b as well as an extension in vertical direction 1c and preferably defines an internal volume 2a. According to one aspect, the internal volume 2a is at least adapted for transportation of passengers, so that the multirotor aircraft 1 as a whole is adapted for transportation of passengers. The internal volume 2a is preferably further adapted for accommodating operational and electrical equipment, such as e. g. an energy storage system that is required for operation of the multirotor aircraft 1.

It should be noted that exemplary configurations of the internal volume 2a that are suitable for transportation of passengers, but also for accommodation of operational and electrical equipment, are readily available to the person skilled in the art and generally implemented to comply with applicable authority regulations and certification requirements regarding passenger transportation. Thus, as these configurations of the internal volume 2a as such are not part of the present invention, they are not described in detail for brevity and conciseness.

According to one aspect, the multirotor aircraft 1 comprises a predetermined number of thrust producing units 3. Preferably, the predetermined number of thrust producing units 3 comprises at least two, preferentially at least three and, illustratively, four thrust producing units 3a, 3b, 3c, 3d. The thrust producing units 3a, 3b, 3c, 3d are embodied for producing thrust in a predetermined direction (19 in FIG. 13) in operation, such that the multirotor aircraft 1 is able to hover in the air as well as to fly in any forward or rearward direction.

Preferably, the thrust producing units 3a, 3b, 3c, 3d are structurally connected to a predetermined number of structural supports 4, which preferentially comprises at least two structural support members 4a, 4b. Illustratively, the predetermined number of structural supports 4 and the predetermined number of thrust producing units 3 form a thrust producing units arrangement 17.

More specifically, the thrust producing units 3a, 3d are preferably connected to a structural support member 4a, and the thrust producing units 3b, 3c to a structural support member 4b, wherein the structural support members 4a, 4b define the predetermined number of structural supports 4. According to one aspect, the structural support members 4a, 4b mechanically couple the four thrust producing units 3a, 3b, 3c, 3d to each other in an X-shaped configuration.

Preferably, at least one of the thrust producing units 3a, 3b, 3c, 3d comprises an associated shrouding in order to improve underlying aerodynamics and to increase operational safety. By way of example, a plurality of shrouding units 6 is shown with four separate shroudings 6a, 6b, 6c, 6d. Illustratively, the shrouding 6a is associated with the thrust producing unit 3a, the shrouding 6b with the thrust producing unit 3b, the shrouding 6c with the thrust producing unit 3c and the shrouding 6d with the thrust producing unit 3d.

The shroudings 6a, 6b, 6c, 6d can be made of a simple sheet metal and/or have a complex geometry. Preferably, the shroudings 6a, 6b, 6c, 6d are connected to the predetermined number of structural supports 4. More specifically, the shroudings 6a, 6d are preferably connected to the structural support member 4a, and the shroudings 6b, 6c to the structural support member 4b.

According to one aspect, at least one and, preferably, each one of the thrust producing units 3a, 3b, 3c, 3d is equipped with at least one rotor assembly. By way of example, the thrust producing unit 3a is equipped with a rotor assembly 8a, the thrust producing unit 3b is equipped with a rotor assembly 8b, the thrust producing unit 3c is equipped with a rotor assembly 8c and the thrust producing unit 3d is equipped with a rotor assembly 8d. The rotor assemblies 8a, 8b, 8c, 8d illustratively define a plurality of rotor assemblies 8, which is preferably mounted to the plurality of shroudings 6 by means of a plurality of gearbox fairings 5 and an associated plurality of supporting structures 7. Illustratively, the rotor assembly 8a is mounted to the shrouding 6a by means of a gearbox fairing 5a and a supporting structure 7a, the rotor assembly 8b is mounted to the shrouding 6b by means of a gearbox fairing 5b and a supporting structure 7b, the rotor assembly 8c is mounted to the shrouding 6c by means of a gearbox fairing 5c and a supporting structure 7c, and the rotor assembly 8d is mounted to the shrouding 6d by means of a gearbox fairing 5d and a supporting structure 7d.

In operation of the multirotor aircraft 1, control of thrust generation by means of the thrust producing units 3a, 3b, 3c, 3d of the predetermined number of thrust producing units 3a, 3b, 3c, 3d for generating thrust in a predetermined direction (19 in FIG. 13) may either be achieved by means of an optional pitch variation, by means of RPM variation or by means of a combination of pitch and RPM variation. If the rotor assemblies 8a, 8b, 8c, 8d of the plurality of rotor assemblies 8 are not provided with an optional pitch variation, e. g. if respective rotor blades of the rotor assemblies 8a, 8b, 8c, 8d are implemented as fixed pitch blades, control of the thrust generation by means of pitch variation cannot by performed. In this case, only RPM variation can be used for control of the thrust generation.

According to one aspect, a flexible suspension unit 9 is provided. The flexible suspension unit 9 is preferably rigidly mounted to the airframe 2 and mechanically couples the thrust producing units arrangement 17 to the airframe 2 such that the thrust producing units 3a, 3b, 3c, 3d of the predetermined number of thrust producing units 3a, 3b, 3c, 3d are inclinable in relation to the airframe 2. Preferably, inclinations in a predetermined range between approximately +/−30° should at least be enabled.

It should be noted that the term "flexible" refers to the inclination ability of the thrust producing units 3a, 3b, 3c, 3d of the predetermined number of thrust producing units 3a, 3b, 3c, 3d in relation to the airframe 2, but not to the suspension unit as such, as explained in more detail below with reference to FIG. 2.

Illustratively, the flexible suspension unit 9 is connected to the structural support members 4a, 4b for mechanically coupling the thrust producing units arrangement 17 to the airframe 2. The flexible suspension unit 9 is described in greater detail hereinafter with reference to FIG. 2 to FIG. 7.

Figure 2:
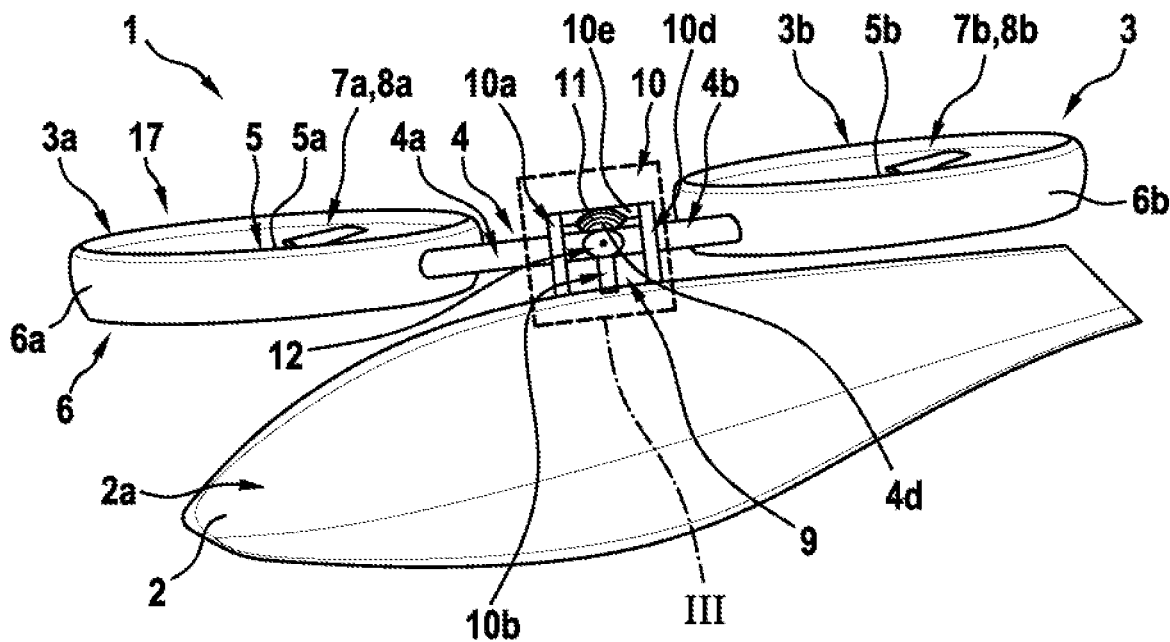
FIG. 2 shows a sectional view of the multirotor aircraft of FIG. 1, seen along a cut line II-II in FIG. 1.

FIG. 2 shows the multirotor aircraft 1 of FIG. 1 with the thrust producing units arrangement 17 that comprises the predetermined number of thrust producing units 3 and the predetermined number of structural supports 4. However, as the multirotor aircraft 1 is illustrated in sectional view, only the thrust producing unit 3a that is connected to the structural support member 4a, and the thrust producing unit 3b that is connected to the structural support member 4b, are shown.

As described above with reference to FIG. 1, the thrust producing units arrangement 17 is mechanically coupled to the airframe 2 by means of the flexible suspension unit 9 of FIG. 1, which is rigidly mounted to the airframe 2 of the multirotor aircraft 1. Therefore, the flexible suspension unit 9 is preferably provided with at least one bearing 11 that mechanically couples the thrust producing units arrangement 17 to the airframe 2. The at least one bearing 11 is preferably an elastomeric bearing and, preferentially, a spherical elastomeric bearing.

However, it should be noted that constitution and realization of an elastomeric bearing and, more particularly, a spherical elastomeric bearing, as well as mounting of such a bearing as required according to FIG. 2 are well-known to the person skilled in the art and not part of the present invention. Therefore, these aspects are not described in greater detail, for brevity and conciseness.

According to one aspect, the thrust producing units arrangement 17 is suspended from the flexible suspension unit 9 towards the airframe 2 by means of the at least one bearing 11. In other words, the flexible suspension unit 9 is mechanically coupled to the thrust producing units arrangement 17 by means of the at least one bearing 11 such that the thrust producing units arrangement 17 is hanging over the airframe 2.

By way of example, this is enabled by providing the flexible suspension unit 9 with a connecting structure 10 from which the thrust producing units arrangement 17 is suspended, i.e. from which the thrust producing units arrangement 17 is hanging. The connecting structure 10 preferably comprises a connecting element 10e that is illustratively plate- or disc-shaped.

The plate- or disc-shaped connecting element 10e is according to one aspect spaced apart from the airframe 2 by means of a predetermined number of support members that preferably includes at least two and, preferentially, four support members, from which only three support members 10a, 10b, 10d are visible in FIG. 2. By way of example, the support members 10a, 10b, 10d (and 10c in FIG. 4) form a table-like configuration that is rigidly mounted to the airframe 2.

According to one aspect, the at least one bearing 11 is arranged between the plate- or disc-shaped connecting element 10e and the thrust producing units arrangement 17. More specifically, the at least one bearing 11 is arranged between a side of the plate- or disc-shaped connecting element 10e that faces the airframe 2 and the structural support members 4a, 4b of the thrust producing units arrangement 17. Preferably, a broader side of the at least one bearing 11 is attached to the plate- or disc-shaped connecting element 10e.

Figure 3:
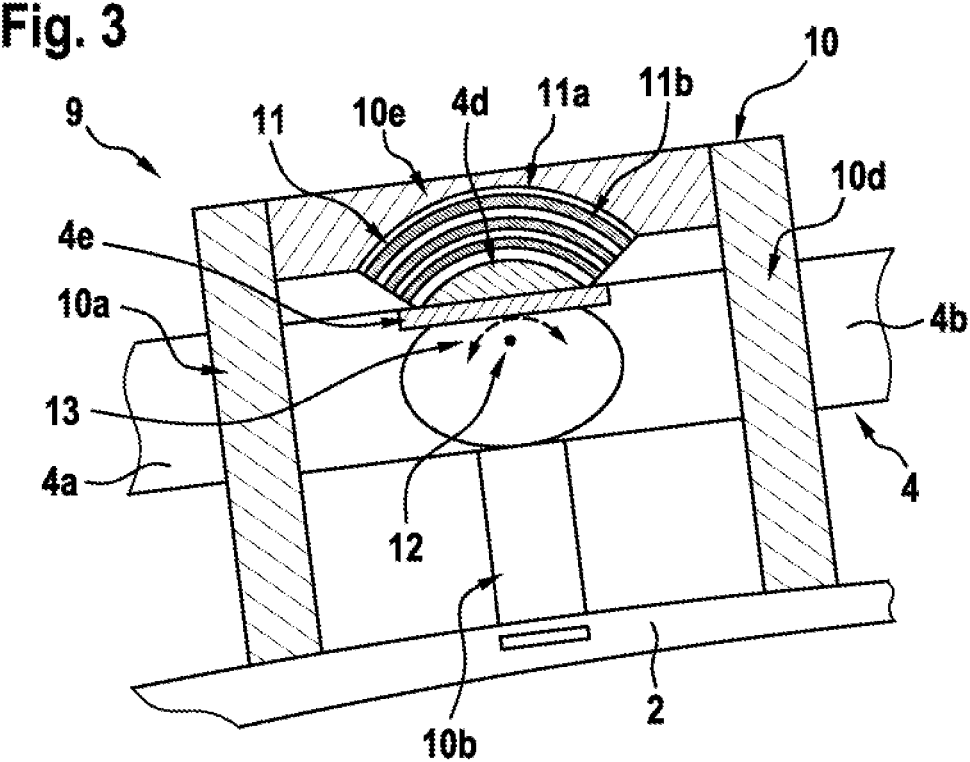
FIG. 3 shows a sectional view of the flexible suspension unit of FIG. 1 and FIG. 2.

FIG. 3 shows the flexible suspension unit 9 of FIG. 2 with the at least one bearing 11 that couples the plate- or disc-shaped connecting element 10e of the connecting structure 10 to the structural support members 4a, 4b. According to one aspect, the structural support members 4a, 4b are provided with a disc- or plate-shaped connecting base element 4e, which is preferentially arranged at an intersection of the structural support members 4a, 4b.

Preferably, the disc- or plate-shaped connecting base element 4e is connected to a coupling member 4d that is coupled to the at least one bearing 11. The coupling member 4d can be rigidly mounted to or integrally formed in one piece with the disc- or plate-shaped connecting base element 4e.

The at least one bearing 11 preferably defines a rotation center 12 for rotation, i.e. inclination resp. tilting of the structural support members 4a, 4b and, therefore, of the thrust producing units 17 of FIG. 1 and FIG. 2. Thus, the at least one bearing 11 provides for a rotational DoF 13 for the structural support members 4a, 4b and, therefore, for the thrust producing units arrangement 17 of FIG. 1 and FIG. 2.

According to one aspect, the at least one bearing 11 comprises a plurality of metal layers 11a that are interleaved with a plurality of elastomeric layers 11b. However, for simplicity and clarity of the drawings, only a single metal layer is labeled with the reference sign 11a and only a single elastomeric layer is labeled with the reference sign 11b.

Figure 4:
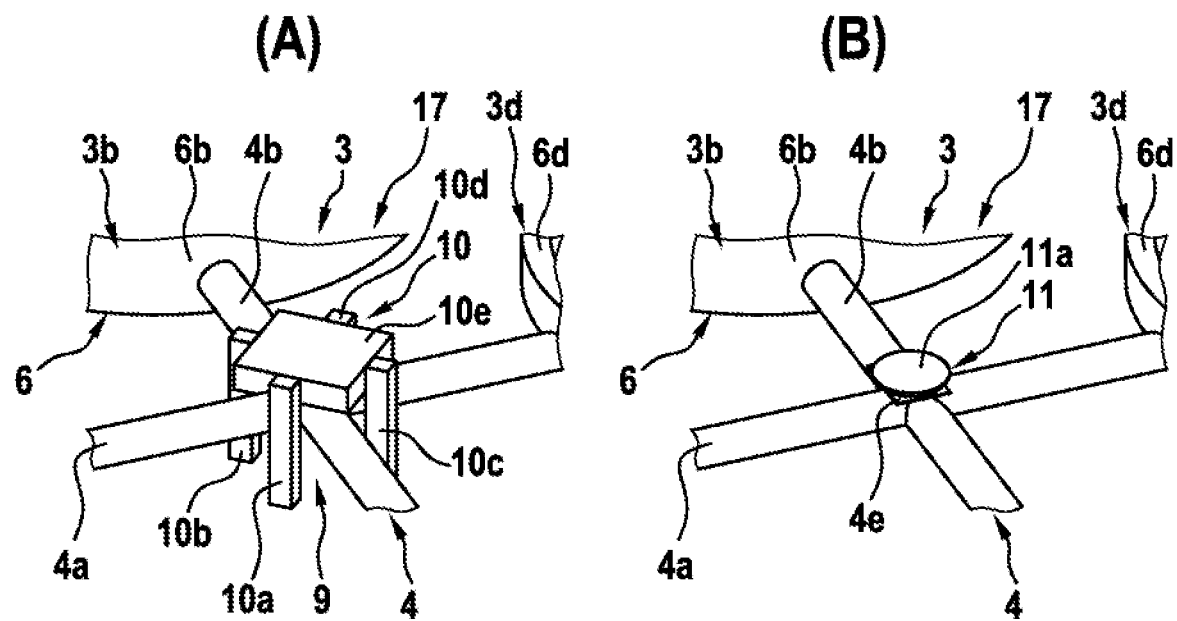
FIG. 4 shows a perspective view of the flexible suspension unit of FIG. 1 to FIG. 3 with a spherical bearing according to one aspect.

FIG. 4 shows the flexible suspension unit 9 with the at least one bearing 11 of FIG. 2 and FIG. 3, from which the thrust producing units arrangement 17 of FIG. 1 and FIG. 2 is suspended. The flexible suspension unit 9 is provided with the connecting structure 10 of FIG. 3.

In part (A) of FIG. 4, the connecting structure 10 is illustrated in greater detail, which preferably does not only include the support members 10a, 10b, 10d of FIG. 3, but moreover an additional support member 10c. Part (A) also further illustrates the table-like configuration of the connecting structure 10.

In part (B) of FIG. 4, illustration of the table-like configuration of the connecting structure 10 is omitted for further illustrating the at least one bearing 11, which is illustratively embodied as a spherical bearing, in particular a spherical elastomeric bearing.

Figure 5:
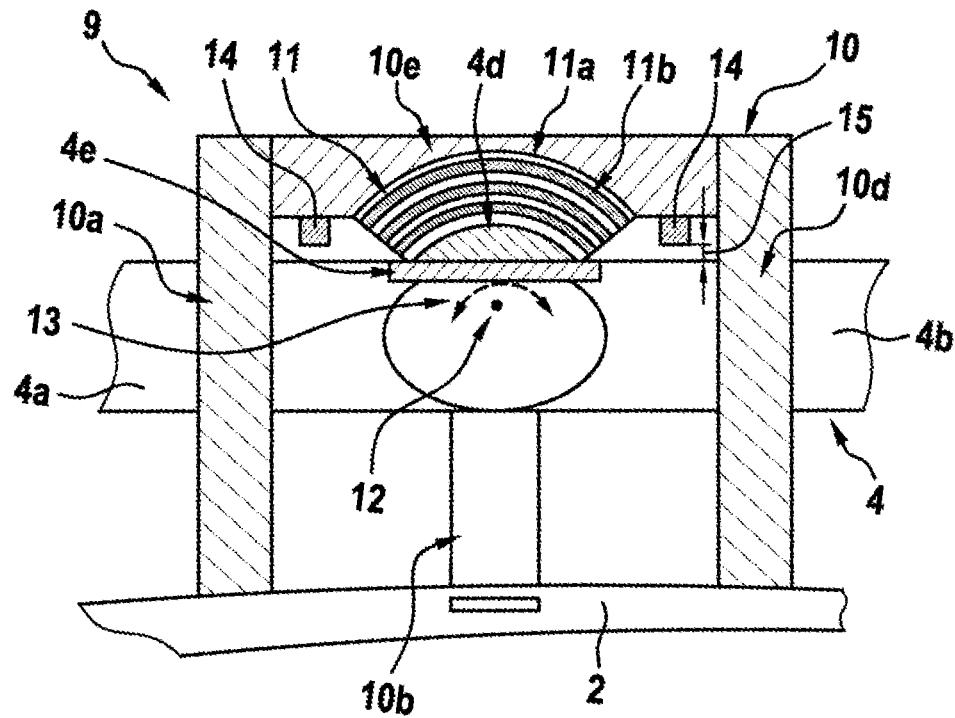
FIG. 5 shows a sectional view of the flexible suspension unit of FIG. 1 and FIG. 2 with mechanical movement limiters according to one aspect.

FIG. 5 shows the flexible suspension unit 9 of FIG. 3 with the at least one bearing 11 that couples the plate- or disc-shaped connecting element 10e of the connecting structure 10 to the structural support members 4a, 4b. However, in contrast to FIG. 3 the flexible suspension unit 9 is now provided with at least one and, exemplarily, two mechanical movement limiters 14 for limiting inclination of the structural support members 4a, 4b and, thus, of the thrust producing units 3a, 3b, 3c, 3d of the predetermined number of thrust producing units 3a, 3b, 3c, 3d of FIG. 1 and FIG. 2 in relation to the airframe 2 of FIG. 1 and FIG. 2.

Illustratively, the mechanical movement limiters 14 are arranged on a side of the plate- or disc-shaped connecting element 10e that faces the structural support members 4a, 4b. Preferably, the mechanical movement limiters 14 are provided for limiting the rotational DoF 13 of FIG. 3 of the structural support members 4a, 4b to an illustrative freedom of movement 15. The latter may be determined in an application-specific manner based on respective realization requirements, which are well-known to the person skilled in the art and, therefore, not explained in greater detail.

Figure 6:
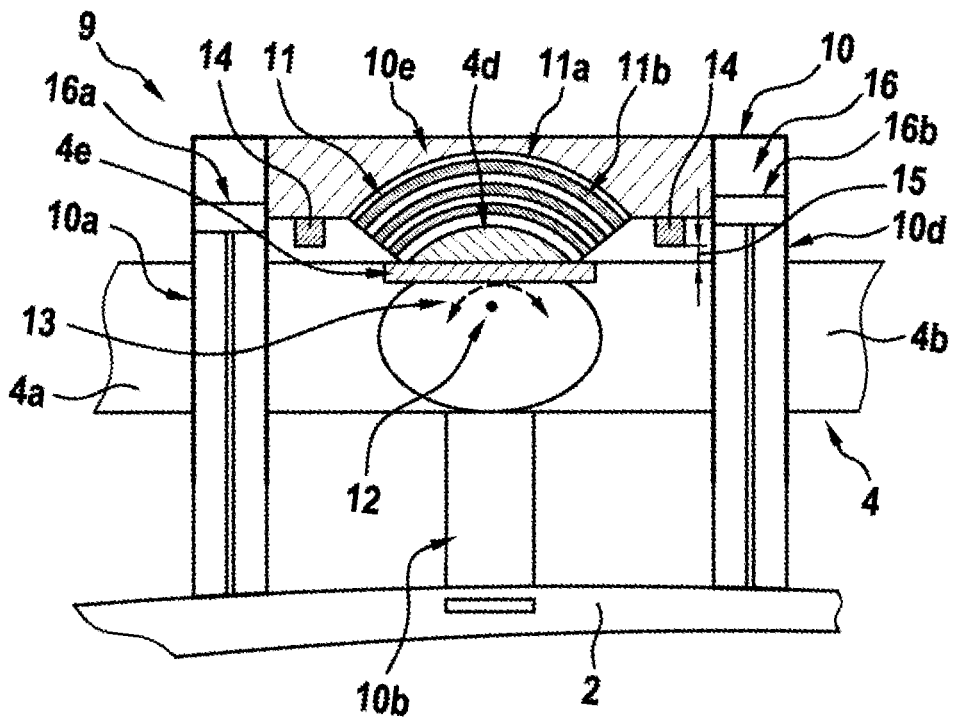
FIG. 6 shows a sectional view of the flexible suspension unit of FIG. 1 and FIG. 2 with mechanical movement limiters and dampening or actuating units according to one aspect.

FIG. 6 shows the flexible suspension unit 9 of FIG. 5 with the two mechanical movement limiters 14 and the at least one bearing 11 that couples the plate- or disc-shaped connecting element 10e of the connecting structure 10, which includes the support members 10a, 10b, 10d (and 10c in FIG. 4), to the structural support members 4a, 4b. However, in contrast to FIG. 5 the flexible suspension unit 9 is now provided with at least one dampening unit 16 for dampening movement of the structural support members 4a, 4b and, thus, of the thrust producing units 3a, 3b, 3c, 3d of the predetermined number of thrust producing units 3a, 3b, 3c, 3d of FIG. 1 and FIG. 2 in relation to the airframe 2 of FIG. 1 and FIG. 2.

Preferably, a dampening unit 16 is mounted to each one of the support members 10a, 10b, 10d (and 10c in FIG. 4). By way of example, two illustrative dampers 16a, 16b are mounted to the support members 10a, 10d, respectively.

It should be noted that the at least one dampening unit 16 advantageously contributes to enhance passenger comfort and to reduce vibration, which could propagate from the thrust producing units 3a, 3b, 3c, 3d of the predetermined number of thrust producing units 3a, 3b, 3c, 3d of FIG. 1 and FIG. 2 into the airframe 2 of FIG. 1 and FIG. 2. Furthermore, it should be noted that according to one aspect the flexible suspension unit 9 with the at least one bearing 11 is a passive system. In other words, tilting resp. inclining of the structural support members 4a, 4b and, thus, of the thrust producing units 3a, 3b, 3c, 3d of the predetermined number of thrust producing units 3a, 3b, 3c, 3d of FIG. 1 and FIG. 2 in relation to the airframe 2 of FIG. 1 and FIG. 2 is preferably not actively controlled. However, actively controlling the tilting resp. inclining of the structural support members 4a, 4b and, thus, of the thrust producing units 3a, 3b, 3c, 3d of the predetermined number of thrust producing units 3a, 3b, 3c, 3d of FIG. 1 and FIG. 2 in relation to the airframe 2 of FIG. 1 and FIG. 2 is nevertheless possible, as described hereinafter.

More specifically, according to one aspect the flexible suspension unit 9 is provided with at least one actuating unit for controlling inclination resp. tilting of the thrust producing units 3a, 3b, 3c, 3d of the predetermined number of thrust producing units 3a, 3b, 3c, 3d of FIG. 1 and FIG. 2 in relation to the airframe 2 of FIG. 1 and FIG. 2. Preferably, an actuating unit is mounted to each one of the support members 10a, 10b, 10d (and 10c in FIG. 4). By way of example, two illustrative actuators are mounted to the support members 10a, 10d, respectively. Thus, the flexible suspension unit 9 can be adapted for an active tilting resp. inclining control.

It should be noted that for simplicity and clarity of the drawings, the at least one actuating unit is illustrated by the same drawing components than the dampening units 16 and, thus, likewise labeled with the reference sign 16. This similarly applies to the actuators with respect to the dampers 16a, 16b, so that the actuators are likewise labeled with the reference signs 16a, 16b.

For instance, the dampers and/or actuators 16a, 16b can be implemented by means of hydraulic dampers, pneumatic actuators and so on. E.g., by regulating the air pressure in pneumatic actuators, the pitch attitude of the airframe 2 of FIG. 1 and FIG. 2 can be modified; the damping characteristics of the pneumatic cylinder are hereafter adjustable. In contrast, use of hydraulic dampers will primarily only influence corresponding damping characteristics of the flexible suspension unit 9. This additional damping could be needed, depending on an underlying system design. However, actuators and/or dampers using other regulating principles are also possible.

According to one aspect, either the dampening units or the actuating units are provided. However, alternatively combined dampening and actuating units 16 are provided, which can be controlled for actuating the flexible suspension unit 9, i.e. the structural support members 4a, 4b, as required and, otherwise, be used for dampening movement of the structural support members 4a, 4b in operation. The dampening and/or actuating units 16 may also be required for restricting respective pitch movements of the airframe 2 of FIG. 1 and FIG. 2.

Figure 7:
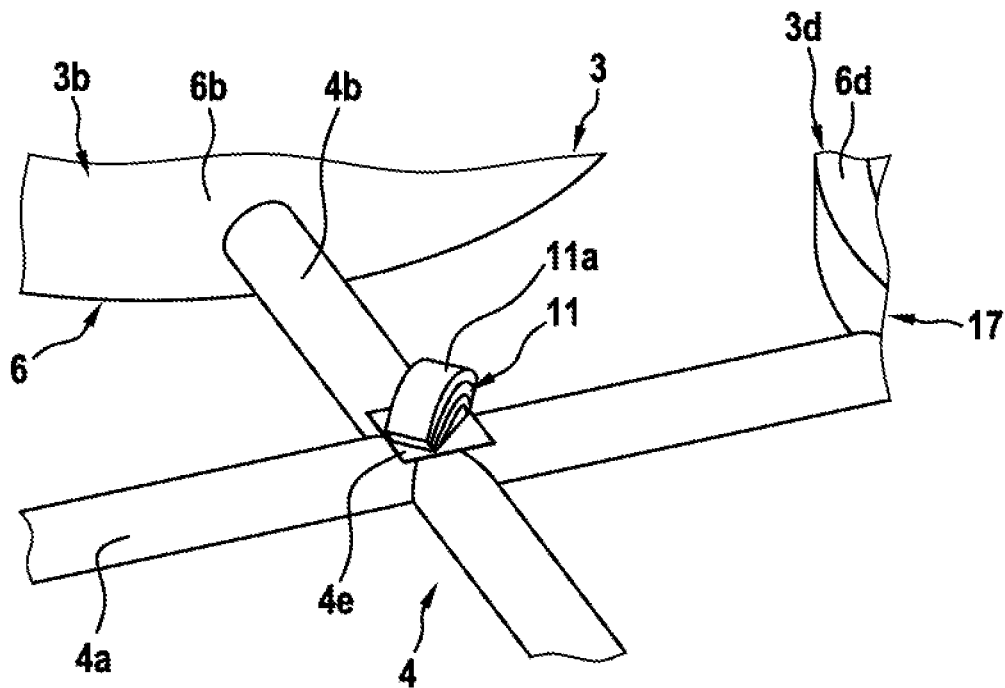
FIG. 7 shows a perspective view of the flexible suspension unit of FIG. 1 to FIG. 3 with a cylindrical bearing according to one aspect.

FIG. 7 shows the thrust producing units arrangement 17 with the at least one bearing 11 of FIG. 2 and FIG. 3 in analogy to FIG. 4, part (B). However, in contrast to FIG. 4, part (B), the at least one bearing 11 is now illustratively embodied as a cylindrical bearing, in particular a cylindrical elastomeric bearing. Nevertheless, compared to the spherical elastomeric bearing of FIG. 4, part (B), the cylindrical elastomeric bearing has one DoF less and possess, thus, only a single DoF.

However, it should be noted that the present invention is not limited to such a cylindrical bearing or to a spherical bearing, as illustrated in FIG. 4, part (B). Instead, other bearing types, such as e.g. rotational bearings, are likewise contemplated.

Figure 8:
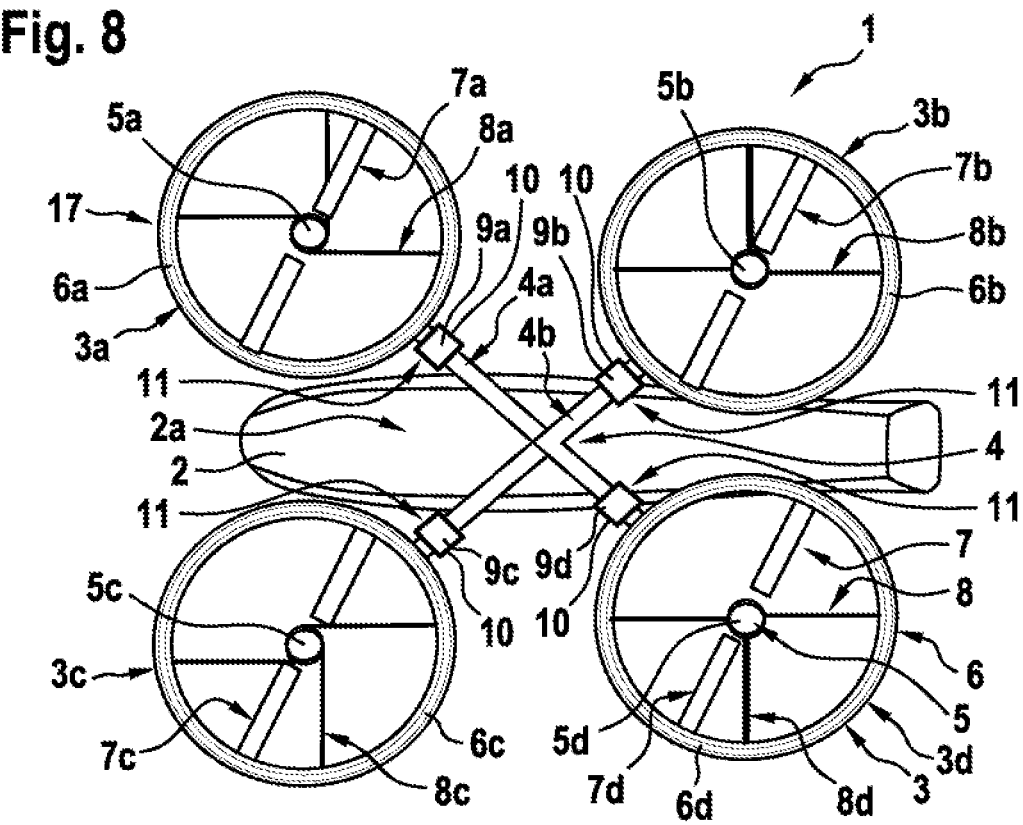
FIG. 8 shows a top view of the multirotor aircraft of FIG. 1 with four flexible suspension units according to one aspect.

FIG. 8 shows the multirotor aircraft 1 of FIG. 1 with the airframe 2 and the thrust producing units arrangement 17 that comprises the predetermined number of thrust producing units 3 and the predetermined number of structural supports 4. The predetermined number of thrust producing units 3 comprises the four thrust producing units 3a, 3b, 3c, 3d and the predetermined number of structural supports 4 comprises the structural support members 4a, 4b that mechanically couple the four thrust producing units 3a, 3b, 3c, 3d to each other in an X-shaped configuration.

However, in contrast to FIG. 4 now preferably four flexible suspension units 9a, 9b, 9c, 9d are provided instead of the single flexible suspension unit 9 of FIG. 1. Nevertheless, according to one aspect each one of the four flexible suspension units 9a, 9b, 9c, 9d is configured similar to the flexible suspension unit 9 as described above, at least within predetermined manufacturing tolerances.

Preferably, each one of the flexible suspension units 9a, 9b, 9c, 9d is rigidly mounted to the airframe 2. Thus, each one of the four thrust producing units 3a, 3b, 3c, 3d is separately inclinable with respect to the airframe 2.

It should be noted that a particular arrangement of the flexible suspension units 9a, 9b, 9c, 9d with respect to the airframe 2 can be determined in an application-specific manner based on predetermined implementation requirements. For instance, while the flexible suspension units 9b, 9d are exemplarily arranged on top of the airframe 2, the flexible suspension units 9a, 9c are slightly displaced with respect to the airframe 2. However, the flexible suspension units 9a, 9c may also be arranged on top of the airframe 2 and the lateral displacement is preferably acceptable as long as the flexible suspension units 9a, 9c are installed such that the structural support members 4a, 4b are suspended therefrom. By arranging the flexible suspension units 9a, 9c as illustrated, they can advantageously be positioned close to the thrust producing units 3a, 3c, respectively.

FIG. 9 shows the multirotor aircraft 1 of FIG. 1 with the airframe 2 and the thrust producing units arrangement 17 that comprises the predetermined number of thrust producing units 3 and the predetermined number of structural supports 4. The predetermined number of thrust producing units 3 comprises the four thrust producing units 3a, 3b, 3c, 3d and the predetermined number of structural supports 4 comprises the structural support members 4a, 4b.

However, in contrast to FIG. 1 the predetermined number of structural supports 4 now further comprises an additional structural support member 4c. According to one aspect, the structural support members 4a, 4b, 4c mechanically couple the four thrust producing units 3a, 3b, 3c, 3d to each other in an H-shaped configuration.

More specifically, in this H-shaped configuration respectively two thrust producing units 3a, 3c; 3b, 3d are mechanically coupled to each other by means of one of the structural support members 4a, 4b. The structural support member 4c exemplarily connects the structural support members 4a, 4b and, thus, defines the H-shaped configuration.

Illustratively, each one of the structural support members 4a, 4b is embodied as an at least essentially straight beam, which is mechanically coupled to the airframe 2 by means of an associated flexible suspension unit, e.g. the flexible suspension units 9a, 9b of FIG. 8, respectively. In other words, at least two mechanically coupled thrust producing units 3a, 3c and 3b, 3d are now respectively mechanically coupled to the airframe 2 by means of the bearings 11.

Thus, in contrast to FIG. 4 now preferably the two flexible suspension units 9a, 9b are provided instead of the single flexible suspension unit 9 of FIG. 1. The structural support member 4c is preferably also embodied as an at least essentially straight beam.

FIG. 10 shows the multirotor aircraft 1 of FIG. 9 with the airframe 2 and the thrust producing units arrangement 17 that comprises the predetermined number of thrust producing units 3 and the predetermined number of structural supports 4. The predetermined number of thrust producing units 3 comprises the four thrust producing units 3a, 3b, 3c, 3d and the predetermined number of structural supports 4 comprises the structural support members 4a, 4b, 4c, which mechanically couple the four thrust producing units 3a, 3b, 3c, 3d to each other in an H-shaped configuration. However, in contrast to FIG. 9 only the structural support member 4c and, thus, the thrust producing units arrangement 17 is mechanically coupled to the airframe 2 by means of an associated flexible suspension unit, illustratively the flexible suspension unit 9 of FIG. 1.

Figure 11:
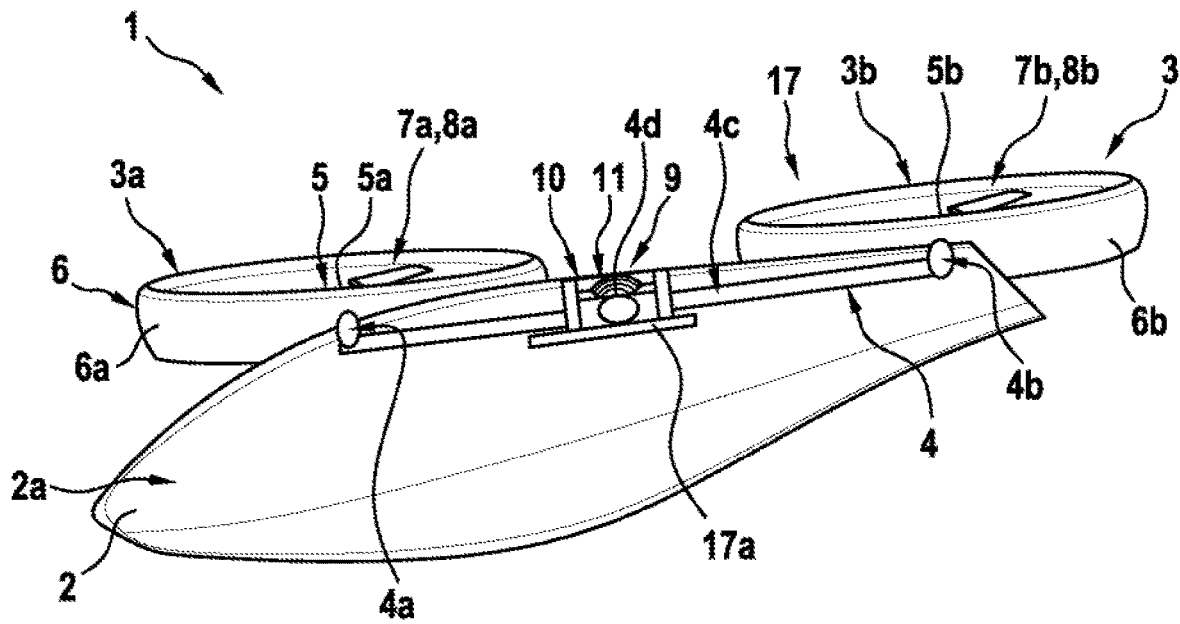
FIG. 11 shows a sectional view of the multirotor aircraft of FIG. 1, seen along a cut line II-II in FIG. 1, with a detachable flexible suspension unit.

FIG. 11 shows the multirotor aircraft 1 of FIG. 10 with the airframe 2 and the thrust producing units arrangement 17 that comprises the predetermined number of thrust producing units 3 and the predetermined number of structural supports 4. The predetermined number of structural supports 4 comprises the structural support members 4a, 4b, 4c, from which only the structural support member 4c is mechanically coupled to the airframe 2 by means of an associated flexible suspension unit, illustratively the flexible suspension unit 9 of FIG. 1. More specifically, the flexible suspension unit 9 is provided with the at least one bearing 11 of FIG. 2, from which the thrust producing units arrangement 17 is suspended via the structural support member 4c.

However, in contrast to FIG. 10, the flexible suspension unit 9 is now preferably rigidly mounted to a coupling structure 17a. According to one aspect, the coupling structure 17a allows detachment and removal of the thrust producing units arrangement 17 from the airframe 2, as described hereinafter with reference to FIG. 12.

Figure 12:
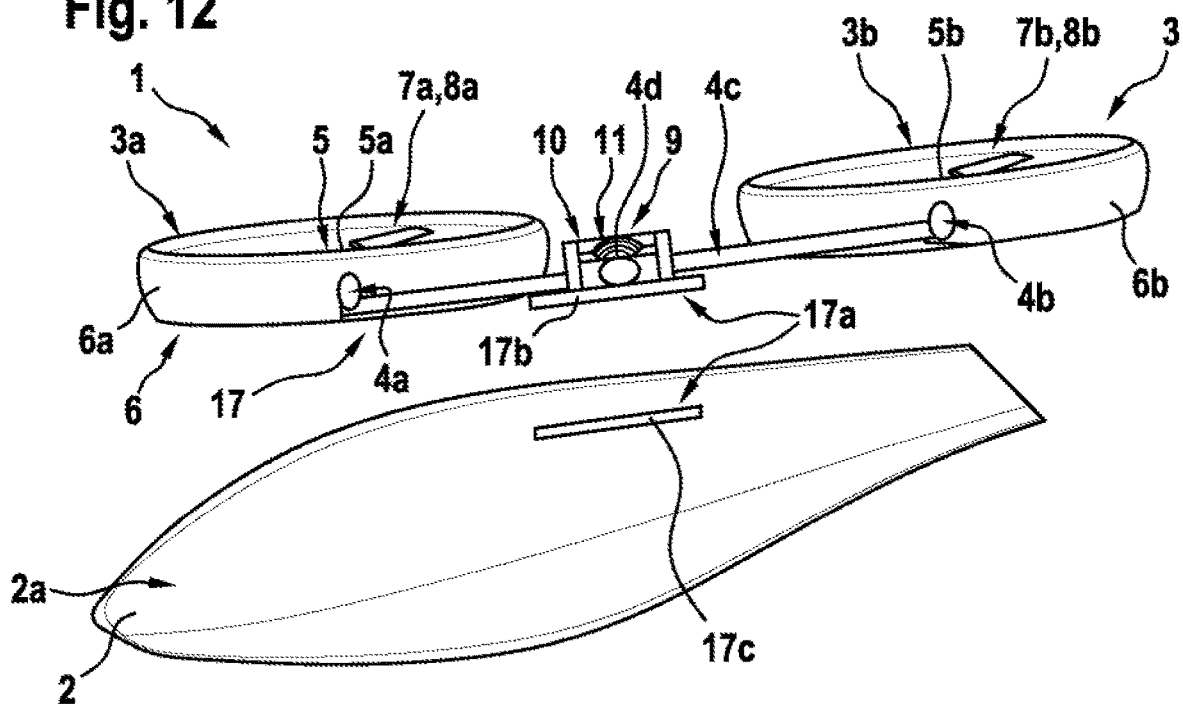
FIG. 12 shows the multirotor aircraft of FIG. 11 with detached flexible suspension unit.

FIG. 12 shows the multirotor aircraft 1 of FIG. 11 with the airframe 2, the flexible suspension unit 9 and the thrust producing units arrangement 17 that comprises the predetermined number of thrust producing units 3 and the predetermined number of structural supports 4. The flexible suspension unit 9 is rigidly mounted to the coupling structure 17a of FIG. 11 in order to allow detachment and removal of the thrust producing units arrangement 17 from the airframe 2.

More specifically, according to one aspect, the coupling structure 17a is equipped with two attachment plates 17b, 17c. Preferably, the attachment plate 17b is rigidly mounted to the flexible suspension unit 9, and the attachment plate 17c is rigidly mounted to the airframe 2. Furthermore, the attachment plate 17b can be mounted detachably to the attachment plate 17c, such that the flexible suspension unit 9 is detachably mounted to the airframe 2.

It should be noted that in FIG. 12 the thrust producing units arrangement 17 is illustrated in detached state. This detached state can be advantageous for maintenance or replacement, but also e.g. for recharging of electric power sources of the thrust producing units arrangement 17, and so on.

Figure 13:
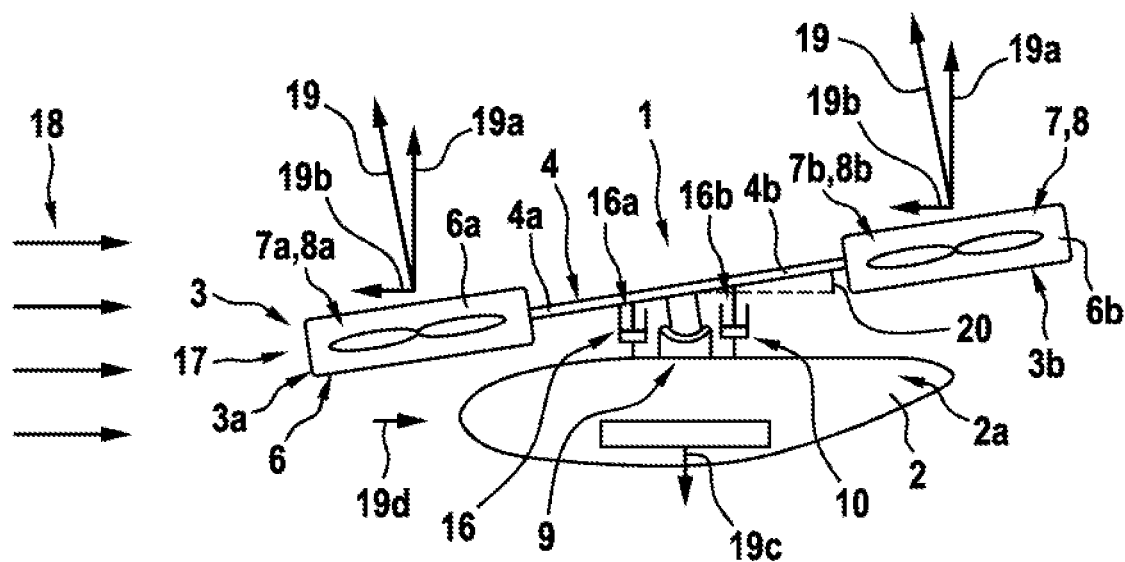
FIG. 13 shows a schematic view the multirotor aircraft of FIG. 1 with the flexible suspension unit in operation.

FIG. 13 shows the multirotor aircraft 1 of FIG. 1 with the airframe 2, the flexible suspension unit 9, and the thrust producing units arrangement 17 that comprises the predetermined number of thrust producing units 3 and the predetermined number of structural supports 4. The thrust producing units arrangement 17 is suspended over the airframe 2 by means of the flexible suspension unit 9, which only exemplarily comprises the dampening and/or actuating units 16 of FIG. 6.

It should be noted that the multirotor aircraft 1 is only represented schematically for explaining an exemplary operation in forward flight thereof. However, this representation is not illustrative of a preferred realization of the multirotor aircraft 1 and, in particular, not for a particular realization of the flexible suspension unit 9, which is shown in FIG. 2 to FIG. 7.

More specifically, in forward flight of the multirotor aircraft 1, the latter is operated in a free airstream with a free airstream direction 18. In order to move in a direction that is opposed to the free airstream direction 18, the predetermined number of thrust producing units 3 generates thrust in a predetermined direction that is indicated with thrust vectors 19. The thrust resp. the thrust vectors 19 respectively comprise a lift component 19a and a propulsion component 19b.

The lift component 19a is responsible for maintaining the multirotor aircraft 1 in the air, i.e. in flying state, against a gravitational force, to which the multirotor aircraft 1 is subjected and which is illustrated by an arrow 19c. The propulsion component 19b is responsible for moving resp. pushing the multirotor aircraft 1 into forward flight direction, i.e. illustratively into a direction that is opposed to the free airstream direction 18, which creates aerodynamic drag 19d on the multirotor aircraft 1.

It should be noted that the propulsion component 19b of the thrust vectors 19 is only created if the predetermined number of thrust producing units 3 is inclined. According to the present invention, this is achieved by tilting resp. inclining the predetermined number of thrust producing units 3, i.e. the thrust producing units arrangement 17, by an associated inclination angle 20 in relation to the airframe 2.

Figure 14:
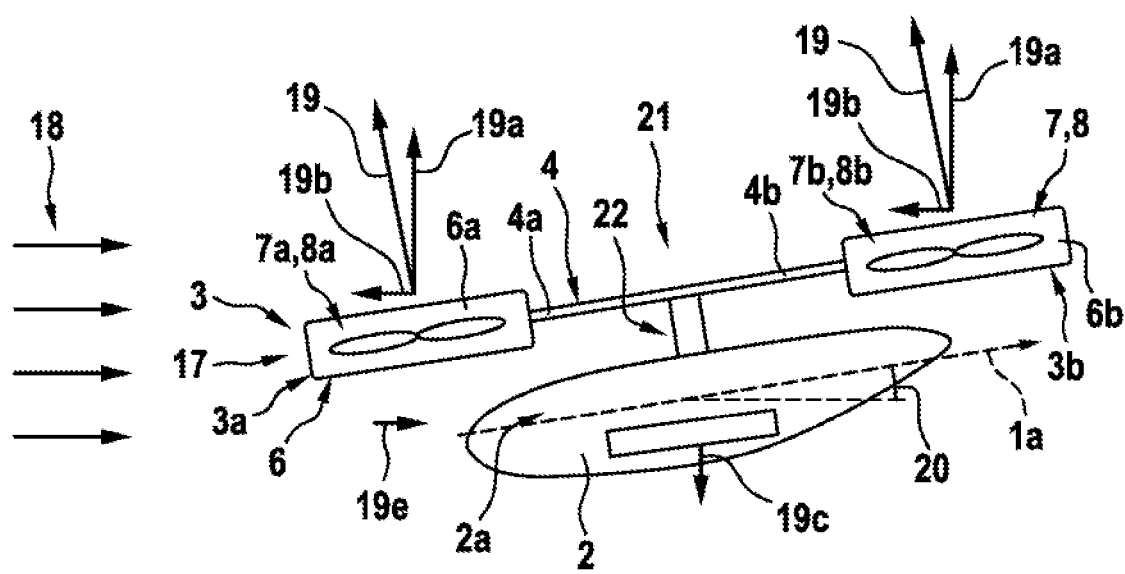
FIG. 14 shows a schematic view of a multirotor aircraft with fixed attachment unit in operation.

FIG. 14 shows a multirotor aircraft 21 with the airframe 2 of FIG. 1 and the thrust producing units arrangement 17 of FIG. 1 that comprises the predetermined number of thrust producing units 3 of FIG. 1 and the predetermined number of structural supports 4 of FIG. 1. However, instead of the flexible suspension unit 9 of FIG. 1, a fixed attachment unit 22 is provided that fixedly attaches the thrust producing units arrangement 17 to the airframe 2 in a manner that does not allow tilting resp. inclining of the thrust producing units arrangement 17 in relation to the airframe 2.

It should be noted that the multirotor aircraft 21 is only represented schematically for explaining operation in forward flight thereof. However, this representation is not illustrative of a possible realization of the multirotor aircraft 21 and, in particular, not for a particular realization of the fixed attachment unit 22.

By way of example, the multirotor aircraft 21 is operated in forward flight in a free airstream with the free airstream direction 18 of FIG. 13 and the predetermined number of thrust producing units 3 generates thrust in a predetermined direction that is indicated with the thrust vectors 19 of FIG. 13. The thrust resp. the thrust vectors 19 respectively comprise the lift component 19a of FIG. 13 and the propulsion component 19b of FIG. 13. The lift component 19a is responsible for maintaining the multirotor aircraft 21 in the air, i.e. in flying state, against a gravitational force, to which the multirotor aircraft 21 is subjected and which is illustrated by the arrow 19c of FIG. 13. The propulsion component 19b is responsible for moving resp. pushing the multirotor aircraft 21 into forward flight direction, i.e. illustratively into a direction that is opposed to the free airstream direction 18, which creates aerodynamic drag 19e on the multirotor aircraft 21.

As explained above with reference to FIG. 13, the propulsion component 19b of the thrust vectors 19 is only created if the predetermined number of thrust producing units 3 is inclined. As the thrust producing units arrangement 17 is fixedly attached to the airframe 2, this is achieved by inclining the entire multirotor aircraft 21 as required. By way of example, the entire multirotor aircraft 21 is inclined by the associated inclination angle 20 of FIG. 13.

In other words, the inclination of the thrust producing units arrangement 17 is exemplarily identical in FIG. 13 and FIG. 14. However, while in FIG. 13 the airframe 2 is not inclined, in FIG. 14 the entire multirotor aircraft 21 is inclined and the aerodynamic drag 19e which is accordingly created is, thus, significantly greater than the aerodynamic drag 19d of FIG. 13. Consequently, a respectively required power supply for operation of the multirotor aircraft 21 is significantly greater than a respectively required power supply for operation of the multirotor aircraft 1 according to FIG. 13.

Finally, it should be noted that modifications of the above described aspects of the present invention are also within the common knowledge of the person skilled in the art and, thus, also considered as being part of the present invention. For instance, instead of the above-described X- and H-shaped configurations, other configurations are likewise contemplated. For instance, a T-shaped configuration can be realized, if only three thrust producing units are used. Furthermore, arrangement of the flexible suspension units can be adapted in wide ranges. For instance, instead of arranging the flexible suspension units close to the thrust producing units as illustrated in FIG. 8, they can be installed comparatively close to each other instead. Furthermore, a single flexible suspension unit can be provided with more than one bearing, and so on.

REFERENCE LIST

1 Multirotor aircraft
1a Aircraft longitudinal direction

1b Aircraft lateral direction
1c Aircraft vertical direction
2 Aircraft airframe
2a Aircraft airframe internal volume
3 Thrust producing units
3a, 3b, 3c, 3d Thrust producing unit
4 Thrust producing units supporting structure
4a, 4b, 4c Thrust producing unit supporting structure member
4d Supporting structure coupling member
4e Connecting base element
5 Gearbox fairings
5a, 5b, 5c, 5d Gearbox fairing
6 Shrouding units
6a, 6b, 6c, 6d Shrouding
7 Shrouding supporting structures
7a, 7b, 7c, 7d Shrouding supporting structure
8 Rotor assemblies
8a, 8b, 8c, 8d Rotor assembly
9 Flexible suspension units
9a, 9b, 9c, 9d Flexible suspension unit
10 Connecting structure
10a, 10b, 10c, 10d Connecting structure support member
10e Support member connecting element
11 Elastomeric bearing
11a Metal layer
11b Elastomeric layer
12 Thrust producing units supporting structure rotation center
13 Rotational degree of freedom
14 Mechanical movement limiter
15 Freedom of movement
16 Dampening and/or actuating units
16a, 16b Damper and/or actuator
17 Thrust producing units arrangement
17a Thrust producing units arrangement coupling structure
17b, 17c Attachment plates
18 Free airstream direction
19 Thrust vector
19a Lift component
19b Propulsion component
19c Gravitational force
19d Produced Drag with flexible suspension unit
19e Produced Drag with fixed suspension unit
20 Inclination angle
21 Multirotor aircraft with fixed attachment unit
22 Fixed attachment unit

What is claimed is:

1. A multirotor aircraft with an airframe and a thrust producing units arrangement, wherein the airframe defines an internal volume that is at least adapted for transportation of passengers, and wherein the thrust producing units arrangement comprises at least one structural support member mechanically coupling a predetermined number of thrust producing units for producing thrust in a predetermined direction, wherein a flexible suspension unit is rigidly mounted to the airframe and comprises at least one bearing that directly mechanically couples the at least one structural support member of the thrust producing units arrangement to the airframe such that the thrust producing units of the predetermined number of thrust producing units are inclinable in relation to the airframe, wherein the flexible suspension unit comprises a connecting structure from which the at least one structural support member of the thrust producing units arrangement is suspended towards the airframe by the at least one bearing such that the thrust producing units arrangement is hanging over the airframe via the bearing, wherein the at least one bearing is a spherical elastomeric bearing or a cylindrical elastomeric bearing, and wherein the predetermined number of thrust producing units comprises a plurality of mechanically coupled rotor assemblies that are mechanically coupled to the airframe by means of the at least one bearing.

2. The multirotor aircraft of claim 1,
wherein the predetermined number of thrust producing units comprises four rotor assemblies that are mechanically coupled to each other via the at least one structural support member provided in an H-shaped configuration, wherein respectively two rotor assemblies are mechanically coupled to each other by means of an at least essentially straight structural support member of the at least one structural support member, and wherein the H-shaped configuration is mechanically coupled to the airframe by means of the at least one bearing.

3. The multirotor aircraft of claim 2,
wherein each at least essentially straight structural support member is mechanically coupled to the airframe by means of an associated at least one bearing.

4. The multirotor aircraft of claim 1,
wherein the predetermined number of thrust producing units comprises four rotor assemblies that are mechanically coupled to each other via the at least one structural support member provided in an X-shaped configuration, wherein the X-shaped configuration is mechanically coupled to the airframe by means of the at least one bearing.

5. The multirotor aircraft of claim 1,
wherein the flexible suspension unit comprises at least one mechanical movement limiter for limiting inclination of the thrust producing units of the predetermined number of thrust producing units in relation to the airframe.

6. The multirotor aircraft of claim 1,
wherein the flexible suspension unit comprises at least one dampening unit for dampening movement of the thrust producing units of the predetermined number of thrust producing units in relation to the airframe.

7. The multirotor aircraft of claim 1,
wherein the flexible suspension unit comprises at least one actuating unit for controlling inclination of the thrust producing units of the predetermined number of thrust producing units in relation to the airframe.

8. The multirotor aircraft of claim 1,
wherein the flexible suspension unit is detachably mounted to the airframe.

9. A multirotor aircraft comprising:
an airframe defining an internal volume sized for transportation of passengers;
a thrust producing units arrangement having at least one structural support member mechanically coupling four rotor assemblies, each rotor assembly producing thrust in a predetermined direction; and
a flexible suspension unit connecting the airframe to the thrust producing units arrangement such that the rotor assemblies are inclinable in relation to the airframe, the flexible suspension unit comprising:
a connecting structure rigidly mounted to the airframe, and
a bearing directly mechanically coupling the connecting structure to the at least one structural support member of the thrust producing units arrangement such that the at least one structural support member is suspended below the connecting structure via the bearing, the bearing being one of a spherical elastomeric bearing or a cylindrical elastomeric bearing,
wherein the thrust producing units arrangement is suspended from the connecting structure towards the airframe by the bearing such that the thrust producing units arrangement is hanging over the airframe.

10. The multirotor aircraft of claim 9,
wherein the connecting structure comprises a plate- or disc-shaped connecting element spaced apart from the airframe via a plurality of support members.

11. The multirotor aircraft of claim 10,
wherein the plate- or disc-shaped connecting element and the plurality of support members form a table configuration that is rigidly mounted to the airframe.

12. The multirotor aircraft of claim 10,
wherein the plate- or disc-shaped connecting element has a first face and a second face opposite to the first face, the first face facing the airframe and the plurality of at least one structural support member.

13. The multirotor aircraft of claim 12,
wherein the bearing is positioned between the first face of the plate- or disc-shaped connecting element and the plurality of at least one structural supports support member.

14. The multirotor aircraft of claim 13,
wherein the bearing has a first side and a second side, the first side being broader than the second side, and wherein the first side is connected to the plate- or disc-shaped connecting element and the second side is connected to the plurality of at least one structural supports support member.

15. The multirotor aircraft of claim 12 further comprising a mechanical movement limiter arranged on first face of the plate- or disc-shaped connecting element, and positioned between the plate- or disc-shaped connecting element and the at least one structural support member.

16. The multirotor aircraft of claim 10 further comprising a plurality of dampening units, each dampening unit mounted to an associated support member of at least one structural support member.

17. The multirotor aircraft of claim 10,
wherein the flexible suspension unit is a single flexible suspension unit for the multirotor aircraft.

18. The multirotor aircraft of claim 10 further comprising a coupling structure with a first attachment plate rigidly mounted to the airframe and a second attachment plate rigidly mounted to the connecting structure of the flexible suspension unit, wherein the first and second attachment plates are detachably mounted to one another such that the airframe is removable from the thrust producing units arrangement.

* * * * *